United States Patent [19]

Novak

[11] Patent Number: 5,754,112

[45] Date of Patent: May 19, 1998

[54] POWER ON, MATED, AND ACTIVITY INDICATOR FOR ELECTRONIC DEVICES INCLUDING STORAGE DEVICES

[75] Inventor: Vit F. Novak, Los Altos, Calif.

[73] Assignee: Sun Microsystems, Inc., Palo Alto, Calif.

[21] Appl. No.: 535,758

[22] Filed: Sep. 28, 1995

[51] Int. Cl.$^6$ .................................... G08B 21/00
[52] U.S. Cl. .................... 340/635; 340/502; 340/686; 340/687; 340/332; 395/835
[58] Field of Search .................... 340/502, 635, 340/686, 687, 331, 332, 286.11, 815.45, 945, 971; 395/835, 837, 838, 839

[56] References Cited

U.S. PATENT DOCUMENTS

| 3,594,784 | 7/1971 | Femminella | 340/815.47 X |
| 5,379,184 | 1/1995 | Barraza et al. | 361/685 |

*Primary Examiner*—Thomas Mullen
*Assistant Examiner*—Daryl C. Pope

*Attorney, Agent, or Firm*—Flehr Hohbach Test Albritton & Herbert LLP

[57] ABSTRACT

The present invention signals the power on, mated, and activity status of storage units in a console rack-mounted memory system. The status is signalled using parallel-coupled LEDs activated by logically combined signals provided by a logic circuit using signals available from SCA connector pins that connect the storage units to the console rack. The SCA connector provides MATED1 (pin 44), MATED2 (pin 74), and LED ACTIVE (pin 77) signals that are logically ANDed by the logic circuits. A logic circuit lights an associated parallel-coupled LED pair for a storage unit when LIT=$\overline{\text{MATED}}$·ACTIVE LED, where MATED=0 denotes grounded pins 74 and (optionally) 44, and ACTIVE LED=0 denotes grounded pin 77, and LIT=1 denotes lit LEDs. A steadily lit LED pair denotes that a storage unit is mated into the console rack and is inactive. An intermittent LED pair denotes that the storage unit is mated into the console rack and is presently active (and thus should not be removed). If no LEDs are lit on the console-rack, then it is known that operating power is not being provided to the memory system.

23 Claims, 5 Drawing Sheets

POWER ON, MATED, AND ACTIVITY INDICATOR FOR ELECTRONIC DEVICES INCLUDING STORAGE DEVICES

FIELD OF THE INVENTION

The present invention relates generally to redundant arrays of information storage device units (so-called "RAID" systems), and more specifically to devices for alerting a user to the power on, device mated, and activity status of each storage device unit in such systems.

BACKGROUND OF THE INVENTION

It is known in the art to provide a memory system that includes a plurality of devices for storing, redundantly or otherwise, and/or retrieving data. Frequently the devices are hard disk storage units, each of which has a connector enabling the unit to plug into (or be unplugged from) a bay in a console rack holding many such units. As used herein, the term "bay" refers to an opening in the console rack sized to receive and hold one hard disk storage unit.

Figure 1:
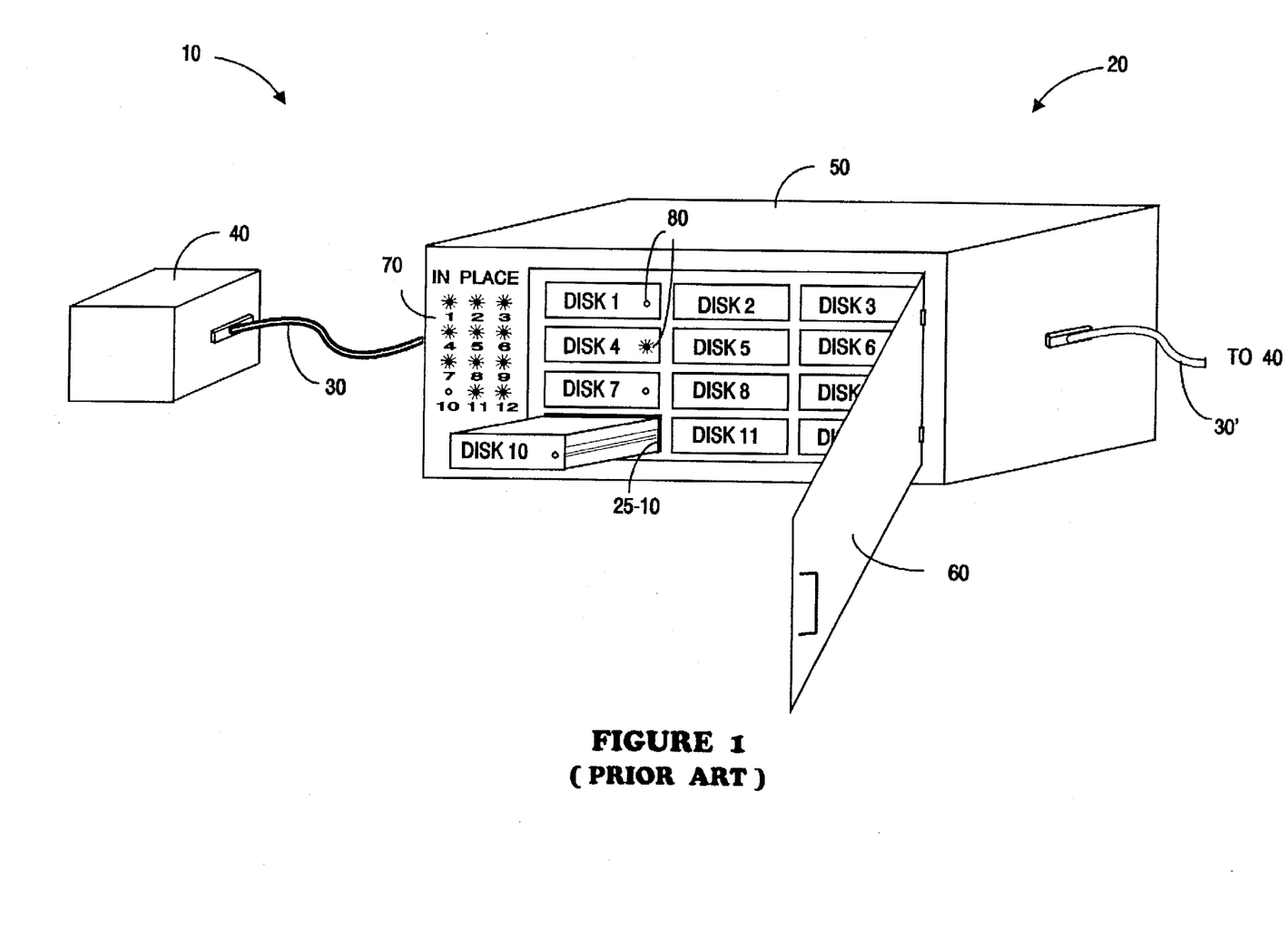
FIG. 1 depicts a memory system with removable storage units, according to the prior art.

FIG. 1 depicts a system 10 that includes a memory system 20 typically coupled by a small computer system interface ("SCSI") 68-pin bus 30 to another device or system 40, e.g., a computer/workstation, or further memory system. Memory system 20 may also be coupled via an output SCSI bus 40' to other devices, noted generally as 40', which other devices may in fact include further memory systems such as system 20, a computer/workstation, or other systems.

Memory system 20 has a fixed number of bays, twelve such openings in the configuration of FIG. 1, and at any given time some or all of the bays will hold storage units. Memory system 20 includes a plurality of storage units, here shown as hard disk units 1 through 12 (abbreviated as DISK 1, DISK 2, etc.), each such unit occupying a bay. DISK 10 is shown partially removed from bay 25-10, and it is understood that in general any hard disk or other storage unit may be inserted into any bay. Typically, the hard disk units will have a large storage capacity of 1 GB or more.

Each storage unit has a separate connector that matingly engages a connector at the rear of a bay within console rack 50. Console rack 50 globally provides operating power (e.g., $V_{cc}$), control, data, and other signals to each storage unit through a connector when the storage unit is plugged into console rack 50. In many systems 20, access to the storage units is gained by opening a panel door 60.

Some memory systems omit panel door 60, or provide a transparent panel door to allow an unimpaired view of the storage units. However, in many memory systems, the panel door 60 may be closed and opaque, or indeed panel door 60 may be located (and access to the storage units occurs) on a side of console rack 50 not readily viewable.

Memory system 20 permits individual storage units to be unplugged and withdrawn from the system, or plugged into the system, even while global operating power is provided by console rack 50 to the storage units. For example, FIG. 1 shows hard disk drive unit ten unplugged from console rack 50, notwithstanding that all of the bays (including the tenth bay) are receiving operating power.

Memory system 20 should therefore permit a technician to readily discern how many storage units are presently plugged into the console rack. Accordingly, an array of indicators 70, typically light emitting diodes ("LEDs"), is located on a readily visible surface of the console rack to indicate how many disk drive units are present therein. Each bay typically includes a switch at the rear of the console rack. When a storage unit is in the bay and is firmly plugged into a mating console rack connector, the switch is depressed, which causes the associated LED to turn on. Thus, in array 70, the LED for disk 10 is off, whereas all other LEDs are on. (In the figures herein, an LED that is on is depicted by a solid circle that emanates radiation, an LED that is off is depicted by an empty circle that does not emanate radiation, and an intermittent LED is indicated by an empty circle that emanates radiation.)

At any given time, one or more of the storage devices plugged into the console rack may be active, e.g., may be writing, reading, or seeking data. Some storage units are manufactured with an LED 80 that is lit when the storage unit is active. Thus, in FIG. 1, disk drive storage units 1, 4, 7 and 10 include such LEDs, and indeed LED 80 on disk drive unit 4 is shown lit to denote that disk four is presently active. Other storage units are not manufactured with such LEDs, and thus it is unknown whether disk drive storage units 2, 3, 5, 6, 8, 9, 11, 12 are presently active.

Alternatively, a handle on a storage unit may obscure an LED 80 thereon, making it difficult to discern whether the storage unit is presently active. Absent some sort of activity indicator, there is a probability of inadvertently removing a presently active storage unit (e.g., disk drive unit 4 in FIG. 1) from the console rack. Removal of an active storage unit can impact the integrity of the memory system data, including data transmitted over bus 30 and/or bus 30'.

One disadvantage of memory system 20 in FIG. 1 is that a technician must open panel door 60 to learn for certain how many storage devices are mounted within console rack 50. Where, for example, there are many systems 20 (or 40 or 40'), discerning how many storage devices are mounted within each system can be time consuming and a source of human error. The technician may consult documentation showing a map of what storage unit is in what column and row in an array of storage units. However, upon opening panel door 60, the technician can readily forget and remove the wrong storage unit. While FIG. 1 depicts twelve storage units, other systems may include a greater or lesser number of storage units.

Further, it is important that the technician not remove a storage unit that is currently active, e.g., in the process or reading, writing, or seeking data. To remove an active storage unit can cause erroneous data to be coupled to SCSI bus 30 and/or 30', as well as to be stored on the active hard disk unit that is inadvertently removed from console rack 50.

Thus, there is a need for a mechanism that permits a technician to readily learn how many storage devices are plugged into a memory system, even when a direct view of the storage devices is not possible. Further, there is a need to identify a presently active storage unit to alert a technician to defer removal from the memory system until the unit is inactive. Preferably such mechanism should not impose a substantial hardware overhead to implement.

The present invention discloses such a mechanism.

SUMMARY OF THE INVENTION

The present invention is used with a memory system that comprises a plurality of storage units that may individually be plugged into or unplugged from SCA-connector (single connector attachment) bays in a console rack, even when operating power is provided to the bays. The present invention provides each bay with a circuit that signals the power on, mated, and activity status of storage units in the console rack. The circuits use parallel-coupled LEDs activated by logically combined signals available from the SCA connector pins.

Preferably, each storage unit mates into a console rack bay using single connector attachment ("SCA) compatible connectors that are mounted on the system backplane within the console rack. For each bay-mounted SCA connector, the SCA connector MATED1, MATED2, and LED ACTIVE signals are logically combined in a logic circuit that includes a resistor and two parallel-coupled LEDs. Each logic circuit is part of a printed circuit board that includes the system backplane. For each storage unit, one of the LEDs is located on the console rack adjacent a bay opening, and the other LED is located on a visible surface of the console rack. The LEDs that are mounted on the visible surface of the console rack preferably are arranged in an array of rows and columns corresponding to the physical arrangement of rows and columns of the bays in the console rack.

A first end of the LEDs is coupled to a source of operating potential, and the second end is coupled to a connector pin that is ground only if a storage unit is mated to the bay-mounted connector, e.g., the MATED2 pin. The first end of the LEDs is also coupled to a connector pin that is ground only when the storage unit that is connector-coupled to the circuit is active, e.g., the LED ACTIVE pin.

When a storage unit is plugged into a bay, a mating condition occurs between its pins and the pins on a corresponding backplane-mounted SCA connector in the console rack. The mating connection grounds the MATED2 connector pin (as well as the MATED1 pin, which is connected to the MATED2 pin for SCA-compatibility). If the storage unit is not presently active, the bay's logic circuit causes the associated LEDs to light steadily, which indicates that the storage unit is plugged into the console rack. The lit LEDs also confirm that operating power is being provided to the console rack.

But if the storage unit is presently active, its LED ACTIVE connector pin is grounded, and the associated logic circuit turns off the otherwise lit LEDs during moments of activity. The resultant intermittent or flashing of the LEDs indicates that this storage unit is presently active. The flashing LEDs also confirm that operating power is being provided to the console rack. Optionally, each bay may be provided with a solenoid-like mechanism that is energized by the logic circuit whenever a storage unit is active. As a result, the solenoid arm (or equivalent device) mechanically prevents removal of an active storage unit from the console rack.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 2:
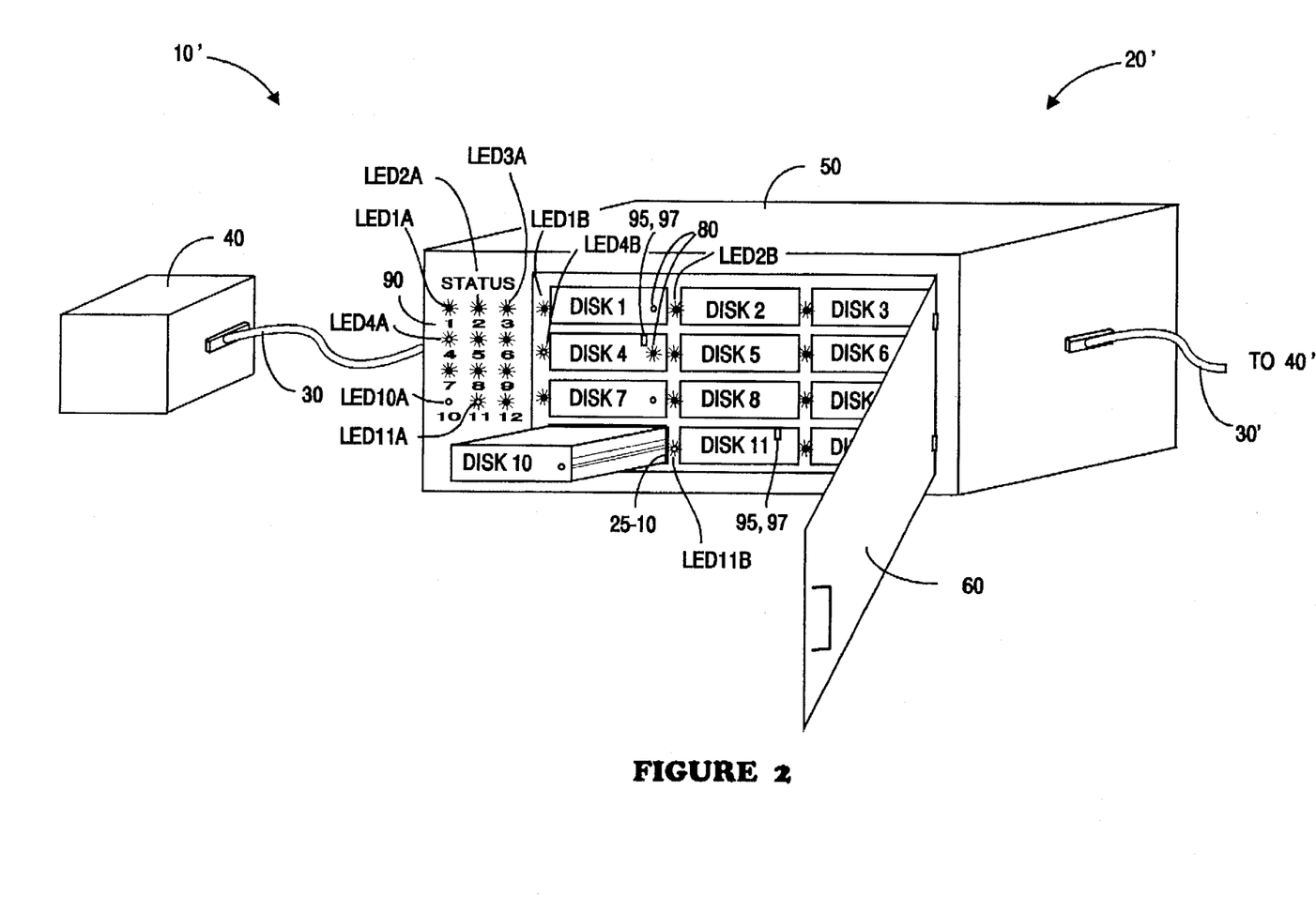
FIG. 2 depicts a memory system with removable storage units and status indicators, according to the present invention.

FIG. 2 depicts a system 10' that includes a memory system 20' coupled by a typically SCSI 68 pin bus 30 to a host or other device 40, a computer or workstation, or other memory system, for example. Similar to prior art FIG. 1, memory system 20' includes a plurality of storage devices, here shown as hard disk units 1 through 12 (abbreviated as DISK 1, DISK 2, etc.), which units may be individually removed from bays in console rack 50 after opening a panel door 60. Memory system 20' may be coupled via an output SCSI bus 40' to other devices, noted generally as 40', which other devices may in fact include further memory systems such as system 20.

Console rack 50' globally provides operating power (e.g., $V_{cc}$), control, data and other signals to each storage device through individual SCA-compatible pin connectors, typically mounted on a backplane (see FIG. 3) within console rack 50. As used herein, the term "SCA connector" shall refer to SCA connectors per se, and to SCA-compatible connectors, all of which connectors meet the requirements of the IEEE SFF (small form factor) 8046 standard. To be compatible with the IEEE SFF (small form factor) 8046 standard, each such connector will have 80 pins, which include a MATED1 input pin (pin 44), a MATED2 pin (pin 74) and an LED ACTIVE pin (pin 77).

According to the present invention, two parallel-coupled indicators are mounted on the console rack for each bay opening. The indicators preferably are LEDs, although other devices may instead be used. For each bay, one of the two LEDs is arranged in a STATUS array 90 on a readily visible surface of console rack 50', and the other LED is mounted adjacent the bay opening.

The LEDs in the STATUS array 90 are preferably arranged in rows and columns that map the row and column arrangement of bays in the console rack. Thus, the first row of LEDs in STATUS array 90 will be LED1A, LED2A, LED3A corresponding to the first three bays that will receive storage units designated in FIG. 2 as DISK 1, DISK 2 and DISK 3, and so on. The bay opening mounted LEDs are shown to the left of each bay in FIG. 2, LED1B corresponding to the first bay (in which DISK 1 is mounted), and so on, LED2B corresponding to the second bay (in which DISK 2 is mounted), and so on. As noted, LED-NA is parallel-coupled with LED-NB, where N is the bay number, $1 \leq N \leq 12$ in FIG. 2.

The lit, intermittently lit, or unlit condition of the parallel-coupled LED indicators permits a technician to readily learn the status of corresponding storage units in the memory system. A steadily lit LED, such as LEDs corresponding to storage units 1, 2, 3, 4, 5, 7, 8, 9, 11 and 12 in FIG. 2, means the corresponding storage unit is plugged into a corresponding SCA connector on a backplane within the console rack, and is presently not active. Thus, any such memory storage unit may safely be unplugged at the present time from the console rack. Further, if any LED is on, then it is known that operating power is presently being provided to the bays in the memory system.

Intermittent or blinking LEDs, such as LED4A–LED4B and LED11A–LED11B mean that the corresponding storage units (here DISK 4 and DISK 11 respectively) are plugged-into corresponding SCA connectors in the console rack, and are presently active. Thus, DISK 4 and DISK 11 may not safely be removed from the console rack while the corresponding LEDs are blinking. Note in FIG. 2 that Disk 4 happens to have been manufactured with an activity LED 80 that will be steadily on during times of activity. As to DISK 4, the blinking condition of LED4A–LED4B is redundant. However, DISK 11, which is also active, is shown as having been manufactured without an activity LED. Thus, in FIG. 2, while DISK 4 and DISK 11 are both plugged in and active, but for the present invention, a technician might remove DISK 11 without realizing that it was active.

In practice, an active storage unit will cause intermittent operation of the associated LEDs. A special case can occur, however, when the storage unit is being reformatted. Reformatting can take many minutes, during which time the storage unit is active and the LED ACTIVE connector pin will be steadily at ground potential. Thus, during reformatting, the LEDs associated with the bay holding the storage unit may be steadily off for several minutes or more. However, as noted, reformatting is a special case and typically the storage units will have been formatted before insertion into the console rack.

However, if reformatting occurs within the console rack, the technician should be reminded that during reformatting a steadily off LED will not necessarily indicate that the storage device is either unmated or is receiving no electrical power.

Optionally, each bay may also be provided with a solenoid or similar electro-mechanical device 95, that is energized by the ACTIVE LED signal available on SCA-connector pin 77. For active storage units such as DISK 4 and DISK 11 in FIGS. 2 and 3, mechanism 95 is activated so that a mechanical arm portion 97 physically prevents removal of the active unit. Note in FIG. 2 that arm portion 97 of device 95 is extended for the two active storage units (DISK 4, DISK 11), whereas a similar arm portion remains retracted (and thus not seen in FIG. 2) for each of the inactive storage units.

Of course an arm portion of device 95 could engage a side or rear portion of the storage unit to physically prevent removal while in an active state, rather than bar the exit/entry opening of the bay as shown. One advantage of the configuration shown in FIG. 2 is that a technician can see the projecting arm and know (redundantly to the associated blinking LED4A–LED4B, LED11A–LED11B) that the storage units must not be removed they are presently active.

A steadily off LED, such as LED 10A–LED10B (the latter being obscured by the partially removed DISK 10), means that the associated storage unit is not plugged into the corresponding SCA connector within the console rack. In FIG. 2, because DISK 10 is indeed partially removed (e.g., unplugged or unmated from its corresponding SCA connector), neither LED10A nor LED10B will be on.

To recapitulate, a technician viewing array 90 would readily see from the configuration shown in FIG. 2 that 11 LEDs are either on or blinking, and that LED10A is steadily off. Thus, even without opening panel door 60, the technician would know that operating power is provided to the bays, that the console rack holds 11 storage units, and that the tenth bay in the console rack is presently empty. Further, it would be known from the two pairs of blinking LEDs that DISK 4 and DISK are presently active, and must not be removed at this moment.

The advantage of providing a redundant LED adjacent each bay opening is that upon opening panel door 60, a technician is instantly reminding by any blinking or intermittent LEDs, e.g., LED4B and LED11B in FIG. 2, that the associated memory storage units, here DISK 4 and DISK 11, must not be removed until the LEDs are again steadily on (e.g., inactive), or steadily off (e.g., no operating power applied to the console rack). Further, array 90 may be on a different surface of the console rack than the bay openings.

Figure 3:
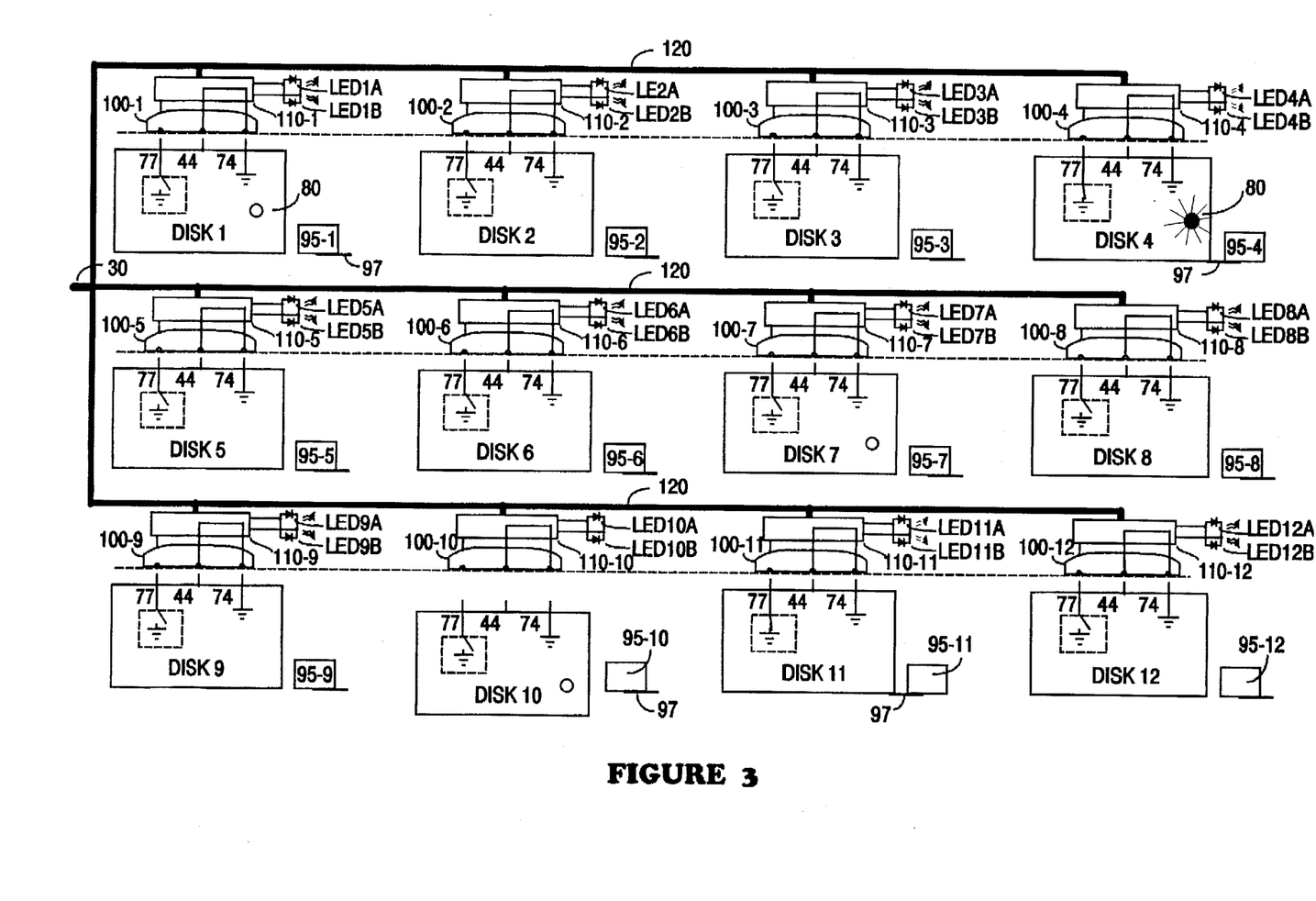
FIG. 3 is a block diagram of the status indicating portion of the memory system of FIG. 2.
Figure 4A:
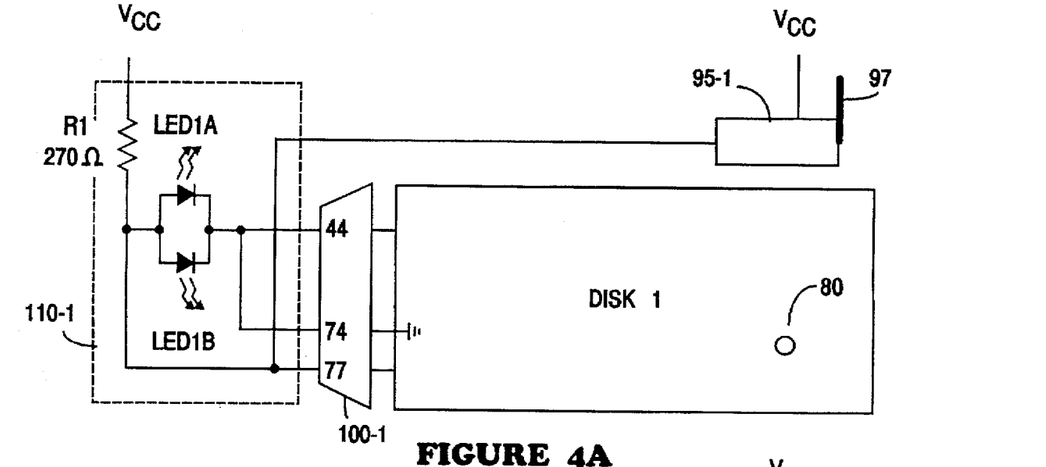
FIG. 4A is a schematic depicting a logic circuit and backplane-mounted SCA connector, and resultant steady-state LED indication for an inactive storage unit plugged into a console rack, according to the present invention.
Figure 4B:
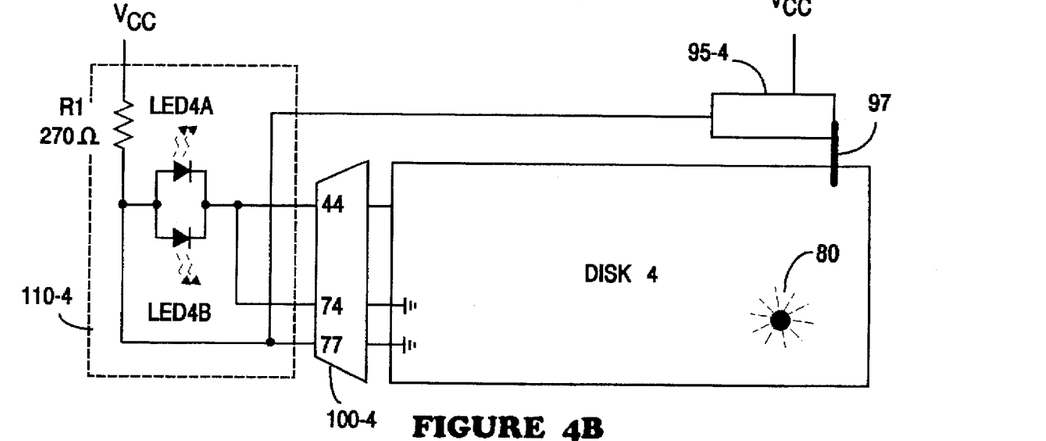
FIG. 4B is a schematic depicting a logic circuit and backplane-mounted SCA connectors, and resultant intermittent-flashing LED indication for an active storage unit plugged into a console rack, according to the present invention.
Figure 4C:
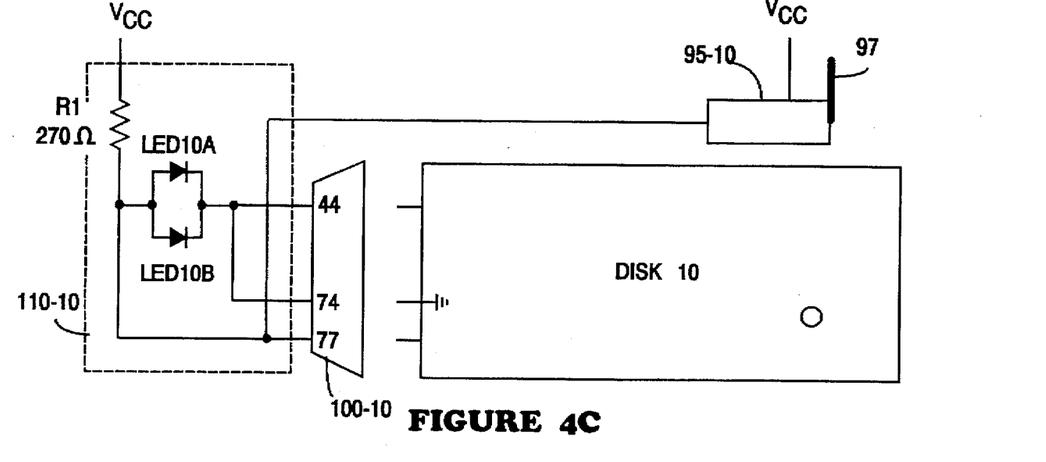
FIG. 4C is a schematic depicting a logic circuit and backplane-mounted SCA connectors, and absence of any LED indication for an storage unit unplugged from a console rack, according to the present invention.

As shown in FIG. 3, each storage unit N plugs into a separate SCA connector 100-N preferably mounted on a backplane 120 within console rack 50'. Although FIG. 3 shows but three pin connections for the SCA connectors, MATED1 (pin 44), MATED2 (pin 74) and LED ACTIVE (pin 77), it is understood that other connections will also be present. In the preferred embodiment, backplane 120 is part of a printed circuit that includes a separate, preferably identical, logic circuit 110-N for each SCA connector 100-N. A plurality of leads couples each of the SCA connectors to the backplane 120, and thence to the bus 30. Coupled to logic circuit 100-N will be parallel-coupled LEDs LED-NA, LED-NB, and optional electro-mechanical mechanism 95-N. To avoid clutter in FIG. 3, the connections between mechanism 95-N and logic circuit 100-N are not shown, but are depicted in FIGS. 4A, 4B, and 4C.

The three pin connections in an SCA connector that are relevant to the present invention will now be described with reference to FIGS. 3, 4A, 4B and 4C. As evident from these figures, for a given storage device or unit, the MATED1 pin (pin 44) and MATED2 pin (pin 44) in the backplane-mounted SCA connector will be at ground potential only when the memory storage device is mated to (e.g., plugged into) the corresponding connector within console rack 50. Connections to pins 44 and 74 are made within each logic circuit 110-N. Internal to each storage unit pin 74 is grounded, and thus mating of SCA connector 100-N with a storage unit N results in grounding of pin 44.

It will be appreciated that the grounding of pin 44 is accomplished to fully comply with SCA compatibility standards, and that the present invention would function if pin 44 were not tied to pin 74. Further, the present invention may be used with any connecting system that grounds at least one pin upon mating, and that grounds at least one other pin when the mated device is in an active state.

In FIG. 3, except for DISK 10 which is not fully inserted into a bay, all other memory storage devices are plugged into bays and mated with corresponding SCA connectors. As a result, only for SCA connector 110-10 corresponding to unmated DISK 10 will pins 44 and 74 be floating rather than at ground potential. This condition is also apparent by comparing FIG. 4C with either of FIGS. 4A and 4B.

Each storage unit's LED ACTIVE pin (pin 77) is an input pin that is internally switched to ground by circuitry within the unit when the storage unit is active. When inactive, the LED ACTIVE pin floats. The condition of pin 77 is shown symbolically in FIG. 3 by a single-pole, single-throw switch whose pole is switched to ground for active units DISK 4 and DISK 11, and is floating otherwise.

FIG. 4B accordingly depicts pin 77 on SCA connector 100-4 at ground potential because DISK 4 is active, whereas in FIG. 4A pin 77 on SCA connector 100-1 is floating because DISK 1 is not active. In FIG. 4C, pin 77 on SCA connector 100-10 is floating because the connector is not mated to DISK 10. For non-storage devices that plug into and out of bays having SCA connectors within the console rack, the LED ACTIVE pin signal is available to signal active or non-active functions other than reading, writing or seeking data. Note in FIG. 3 that only solenoid units 95-4, 95-11 are depicted in an activated disposition that bars removal of active DISK 4, and active DISK 11 from the respective fourth and eleventh bays.

Operation of the logic circuits 110-N and various LEDs used in the present invention will now be described with further reference to FIG. 3, and FIGS. 4A, 4B and 4C. Each logic circuit 110-N includes a resistor R1 (270 Ω in the preferred embodiment), as well as parallel-coupled LED-NA and LED-NB. The anode end of each LED is coupled to the lower end of current limiting resistor R1 and thence to $V_{cc}$, and the cathode end of each LED is coupled to pins 44 and 74 of the associated SCA connector. (Not shown in FIGS. 4A–4C is a 2 KΩ pull-up resistor connected between $V_{cc}$ and pin 44 inside of each DISK N.) Optional solenoid-like mechanism 95-N is coupled between $V_{cc}$ (or other operating potential) and pin 77 within logic circuit 110-N.

The logic circuits 110-N perform a logical AND operation between the $\overline{\text{MATED}}$ SCA condition and the SCA ACTIVE condition:

$$\text{LIT} = \overline{\text{MATED}} \cdot \overline{\text{ACTIVE}} \text{ LED} \quad (1)$$

where MATED=0 denotes grounded pins 44 and 74, and ACTIVE LED=0 denotes grounded pin 77, and LIT=1 denotes lit LEDs.

In FIGS. 2, 3 and 4A, DISK 1 is mated with SCA connector 100-1, but is inactive. As a result, pins 44 and 74 are at ground, and pin 77 is floating. As a consequence, LED1A and LED1B are forward biased and operating current flows from $V_{cc}$, through R1, the LEDs and to grounded pin 74. With reference to equation (1) above, LIT= $\overline{0}\cdot1=1$, which causes LED1A and LED1B to light steadily. This lit condition signals that operating potential is present in the memory system, and that DISK 1 is mated therein but is presently not active. Because pin 77 is floating, no current flows through mechanism 95-1, and mechanical arm 97 remains in a non-blocking position as also shown in FIG. 3. The LEDs for DISKs 2, 3, 5, 6, 7, 8, 9 and 12 would similarly be steadily lit, and optional mechanisms for these mated but inactive disks would similarly remain unenergized and non-blocking.

Consider now FIG. 4B, in which DISK 4 (like DISK 11) is mated and is active. Mating causes pins 74 and 44 to be ground, which normally would forward bias LED4A and LED4B causing these LEDs to be steadily on or lit. However because disk 4 is active, pin 77 is grounded, typically intermittently as a read/write head within disk unit 4 seeks and then reads or writes data. During such activity, the ground condition at pin 77 diverts current from R1 to grounded pin 77 and away from the LEDs. For as long as pin 77 is ground, the otherwise on LEDs are extinguished. With reference to equation (1) above, LIT=$\overline{0}\cdot0$=0, which extinguishes the LEDs for as long as pin 77 is grounded. However, when pin 77 floats, equation (1) is LIT=$\overline{0}\cdot1$=1, which turns on the LEDs. This off/on flashing continues intermittently as pin 77 typically changes states during storage drive unit activity.

By way of example, if an active period causes pin 77 to be grounded for 500 ms, then ungrounded for 100 ms, then grounded for 1 second, LED4A–LED4B would turn off for 500 ms, turn on for 100 ms, turn off for 1 second, and then turn steadily back on as the active period ended. The result would be a flashing or intermittently lit pair of LEDs, which signals a mated storage unit that is receiving operating power and is presently active. Note that during periods of activity when pin 77 is grounded, mechanism 95-4 is energized causing arm 97 to move from a normally non-blocking position to a position that physically bars removal of active disk 4 from the console rack.

Finally, FIG. 4C depicts an obvious case when an unmated DISK 10 results in no LEDs being lit because there is no connection with connector 100-10. The LEDs are off because their cathodes are floating and there is no current flow path. Similarly, device 95-10 is not energized because the absence of a ground coupled to pin 77 eliminates any current flow path.

Figure 5:
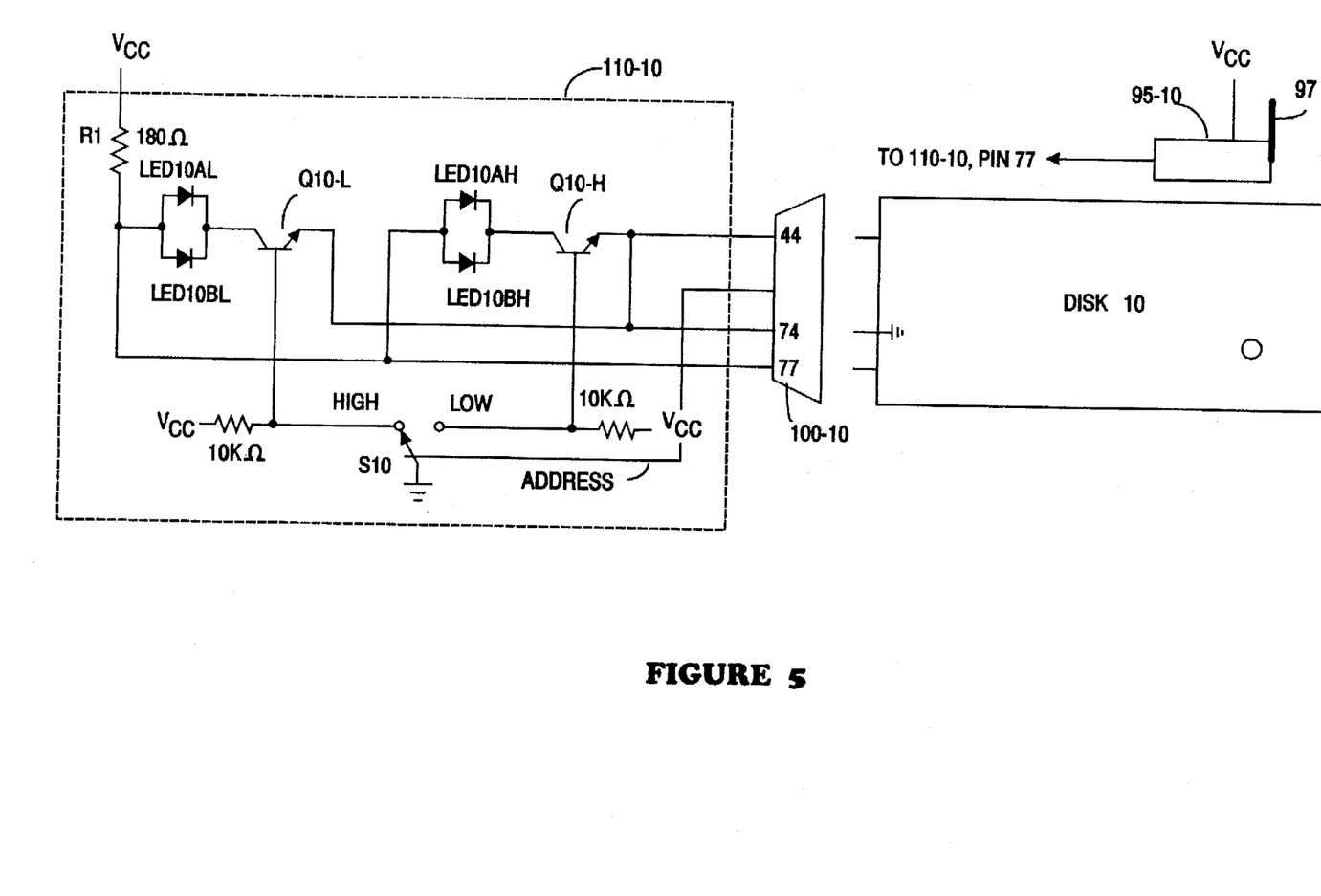
FIG. 5 is a schematic depicting the present invention in a system in which high/low memory addressing may be used.

FIG. 5 depicts a circuit, here 110-10, used with memory systems 20' that use double memory addressing. In such systems, upper and lower addresses present in the SCSI bus 30, 30' may be used. A switch S10, shown schematically as a single-pole-single-throw switch, responds to high/low addresses available from the SCSI bus via one or more pins on connector 100-10. If upper or high addressing is present, S10 is in the left position shown, and if lower addressing is present, S10 is in the right position. (It is understood that S10 in practice preferably is an electronic switch, rather than a mechanical switch.)

For the high addressing case, shown in FIG. 5, the base of transistor Q10-L is grounded by S10, turning Q10-L off. Thus, regardless of pin conditions at connector 100-10, the cathode end of diodes LED10AL, LED10BL is essentially floating, rendering these LEDs inoperative. However, the base of transistor Q10-H is forward biased through a typically 10 KΩ resistor, turning Q10-H on, producing a relatively low impedance from collector to emitter. This allows diodes LED10AH, LED10BH to be on, off, or intermittent as a function of the various SCA-connector 100-10 pin conditions. If desired, the logical switching functions performed by transistors Q10-L, Q10-H may be performed by substituting logic gates for the transistors, to reduce cost of fabrication.

Modifications and variations may be made to the disclosed embodiments without departing from the subject and spirit of the invention as defined by the following claims.

What is claimed is:

1. A signalling circuit for use with a system that includes a console with at least one bay sized to receive and make electrical connection with a removable electronic unit, the circuit comprising:

a first indicator having a first end coupled to a source of operating potential and having a second end coupled to a first connection in said console that is ground only when a said unit is matingly received and electrically connected to said console;

said first end of said indicator also being coupled to a second connection in said console that is grounded when said unit in matingly received and electrically connected to said console and is in an active state, said second connection being floating otherwise;

wherein when said first connection is not grounded said first indicator is in a first indicating state to indicate an unmated condition between said console and said unit;

wherein when said first connection is grounded and said second connection is floating, said first indicator is in a second indicating state to indicate a mated condition between said console and said unit and to indicate that said unit is presently inactive; and wherein when said first connection and said second connection are each grounded, said first indicator is in a third indicating state to indicate a mated condition between said console and said unit and to indicate that said unit is presently active.

2. The circuit of claim 1, further including a second indicator, electrically coupled in parallel to said first indicator;

wherein one of said first indicator and said second indicator is mounted on a visible surface of said console, and a remaining one of said first indicator and said second indicator is mounted adjacent a said bay receiving said unit.

3. The circuit of claim 1, wherein said console includes a plurality of bays, and wherein one said circuit is provided for each of said bays.

4. The circuit of claim 1, wherein said indicator includes a light emitting diode.

5. The circuit of claim 1, wherein said console includes, for each said bay, a single connector attachment (SCA)-compatible connector, and wherein said first connection is at least one of a MATED1 and MATED2 pin on said SCA-compatible connector, and wherein said second connection is an LED ACTIVE pin on said SCA-compatible connector.

6. The circuit of claim 1, wherein said electronic unit has at least one characteristic selected from the group consisting of (i) said unit is a storage device, and (ii) said unit is a hard disk drive unit.

7. The circuit of claim 1, further including a mechanism coupled between said second connection and ground, wherein said mechanism blocks removal of a said unit from said bay when said unit is active.

8. The circuit of claim 1, wherein said circuit is fabricated on a backplane in said console.

9. The circuit of claim 8, wherein said console includes, for each said bay, a single connector attachment (SCA)-compatible connector mounted on said backplane, and wherein said first connection is at least one of a MATED1 and MATED2 pin on said SCA-compatible connector, and wherein said second connection is an LED ACTIVE pin on said SCA-compatible connector.

10. A status indicating system for use with a memory system that includes a console with a plurality of bays, each of said bays sized to receive and make electrical connection with a removable electronic storage unit, the status indicating system comprising:

for each said bay, a first indicator having a first end coupled to a source of operating potential and having a second end coupled to a first connection in said console that is ground only when a said storage unit is matingly received and electrically connected with said bay in said console;

said first end of said indicator also being coupled to a second connection in said console that is grounded when said storage unit is in an active state, said second connection being floating otherwise;

wherein for each said bay, when said first connection is not grounded, said first indicator is in a first indicating state to indicate an unmated condition between a said bay and a said storage unit;

wherein when said first connection is grounded and said second connection is floating, said first indicator is in a second indicating state to indicate a mated condition between a said bay and a said storage unit and to indicate that said storage unit is presently inactive; and wherein when said first and said connection are each grounded, said first indicator is in a third indicating state to indicate a mated condition between a said bay and a said storage unit and to indicate that said storage unit is presently active.

11. The status indicating system of claim 10, further including, for each said bay, a second indicator that is electrically coupled in parallel to said first indicator;

wherein one of said first indicator and said second indicator is mounted on a visible surface of said console, and a remaining one of said first indicator and said second indicator is mounted adjacent a said bay receiving said unit.

12. The status indicating system of claim 10, wherein at least one said indicator includes a light emitting diode.

13. The status indicating system of claim 10, wherein for each said bay said console includes a single connector attachment (SCA)-compatible connector, and wherein said first connection is at least one of a MATED1 and MATED2 pin on said SCA-compatible connector, and wherein said second connection is an LED ACTIVE pin on said SCA-compatible connector.

14. The status indicating system of claim 10, wherein each said storage unit includes a hard disk drive unit.

15. The status indicating system of claim 10, further including a mechanism coupled between said second connection and ground, said mechanism blocking removal from said bay of a said unit when said unit is active.

16. For use with a memory system that includes a console with a plurality of bays, each of said bays sized to receive and make electrical connection with an electronic storage unit, a method for indicating status of each said storage unit in said memory system, the method comprising the following steps:

(a) for each of said bays, providing a first indicator to signal status of a said storage unit within said bay;

(b) for each of said bays, providing a connector for matingly connecting to a said storage unit, said connector including a MATED pin that is grounded when a said storage unit is matingly connected to said bay, and including an ACTIVE LED pin that is grounded when said storage unit is active;

(c) for each of said bays, logically ANDing MATED·ACTIVE LED to form a LIT signal, where MATED=0 denotes a grounded said MATED pin, and where ACTIVE LED=0 denotes an active said storage unit, and where LIT=1 causes said first indicator to signal;

wherein in a first indicating state said first indicator denotes that a said storage unit is mated into said bay, and is receiving operating potential, and is inactive; and wherein in a second indicating state said first indicator denotes that a said storage unit is mated into said bay, and is receiving operating potential, and is presently active.

17. The method of claim 16, wherein:

at step (a) said first indicator includes a light emitting diode ("LED"); and step (c) includes coupling a first end of said first indicator to a source of operating potential and also to said ACTIVE LED pin, and further includes coupling a second end of said first indicator to said MATED pin.

18. The method of claim 16, wherein step (a) includes electrically coupling a second indicator in parallel with said first indicator;

wherein one of said first indicator and said second indicator is mounted on a visible surface of said console, and a remaining one of said first indicator and said second indicator is mounted adjacent a said bay receiving said unit.

19. The method of claim 16, wherein for each said bay step (b) includes providing a single connector attachment (SCA)-compatible connector whose said MATED pin includes a MATED1 pin coupled to a MATED2 pin, said SCA-compatible connector including a said LED ACTIVE pin.

20. The method of claim 16, including an additional step (d) of coupling a mechanism between said LED ACTIVE pin and ground, said mechanism blocking removal from said bay of a said unit when said unit is active.

21. The circuit of claim 1, wherein said first indicator does not signal in said first indicating state, signals steadily in said second indicating state, and signals intermittently in said third indicating state.

22. The status indicating system of claim 10, wherein said first indicator does not signal in said first indicating state, signals steadily in said second indicating state, and signals intermittently in said third indicating state.

23. The method of claim 16, wherein said first indicator signals steadily in said first indicating state, and signals intermittently in said second indicating state.

* * * * *

UNITED STATES PATENT AND TRADEMARK OFFICE
CERTIFICATE OF CORRECTION

PATENT NO. : 5,754,112
DATED : May 19, 1998
INVENTOR(S) : NOVAK

It is certified that error appears in the above-identified patent and that said Letters Patent is hereby corrected as shown below:

Claim 1, column 8, line 49, delete "unit in matingly received" and insert therefore -- unit is matingly received--.

Claim 10, column 9, line 58, delete "said connection" and insert therefore --second connection--.

Signed and Sealed this

Sixth Day of October, 1998

Attest:

BRUCE LEHMAN

Attesting Officer

Commissioner of Patents and Trademarks